United States Patent [19]
Huang et al.

[11] Patent Number: 5,903,660
[45] Date of Patent: May 11, 1999

[54] AUTOMATIC BACKGROUND RECOGNITION AND REMOVAL (ABRR) IN PROJECTION DIGITAL RADIOGRAPHIC IMAGES (PDRI)

[75] Inventors: H. K. Huang, Agoura Hills; Jianguo Zhang, San Francisco, both of Calif.

[73] Assignee: The Regents of the University of California, Oakland, Calif.

[21] Appl. No.: 08/895,333

[22] Filed: Jul. 16, 1997

[51] Int. Cl.[6] ........................................ G06K 9/40
[52] U.S. Cl. .................... 382/132; 382/261; 382/266; 382/275
[58] Field of Search .................... 382/261, 260, 382/263, 266, 269, 209, 210, 217, 218, 128, 132, 275

[56] References Cited

U.S. PATENT DOCUMENTS

| | | | |
|---|---|---|---|
| 4,907,156 | 3/1990 | Doi et al. | 382/132 |
| 5,133,020 | 7/1992 | Giger et al. | 382/128 |
| 5,268,967 | 12/1993 | Jang et al. | 382/132 |
| 5,440,647 | 8/1995 | Floyd, Jr. et al. | 382/132 |
| 5,572,565 | 11/1996 | Abdel-Mottaleb | 382/132 |

*Primary Examiner*—Scott Rogers
*Attorney, Agent, or Firm*—Townsend and Townsend and Crew LLP

[57] ABSTRACT

A system for removal of background from projected digital radiograph images utilizes statistical methods to identify background pixel candidates and probable background edges of a PDRI. Thresholds for evaluating the probable background edges are determined utilizing statistical results and a reliable estimation of background removal is performed.

9 Claims, 13 Drawing Sheets

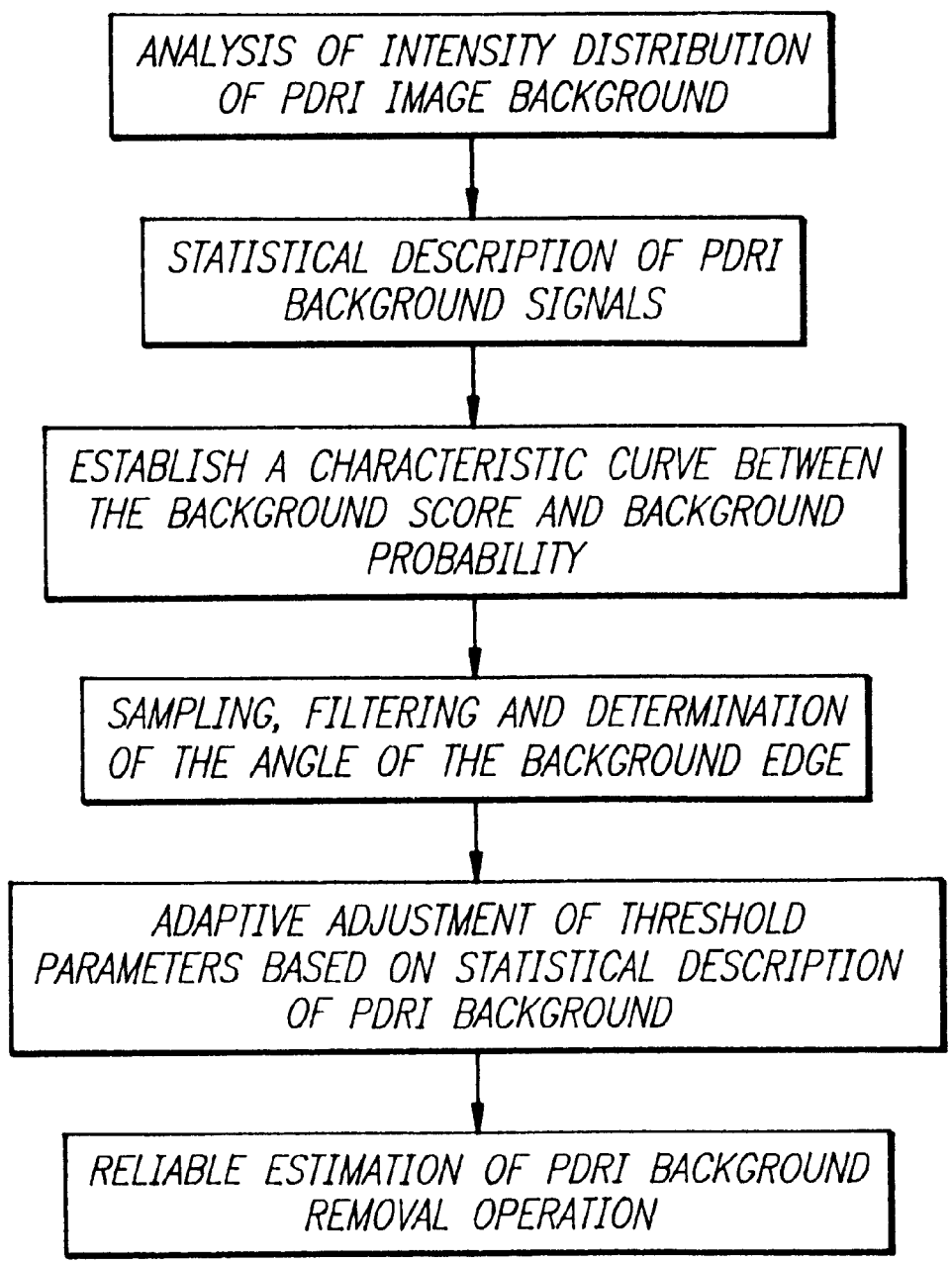

FIG. 3
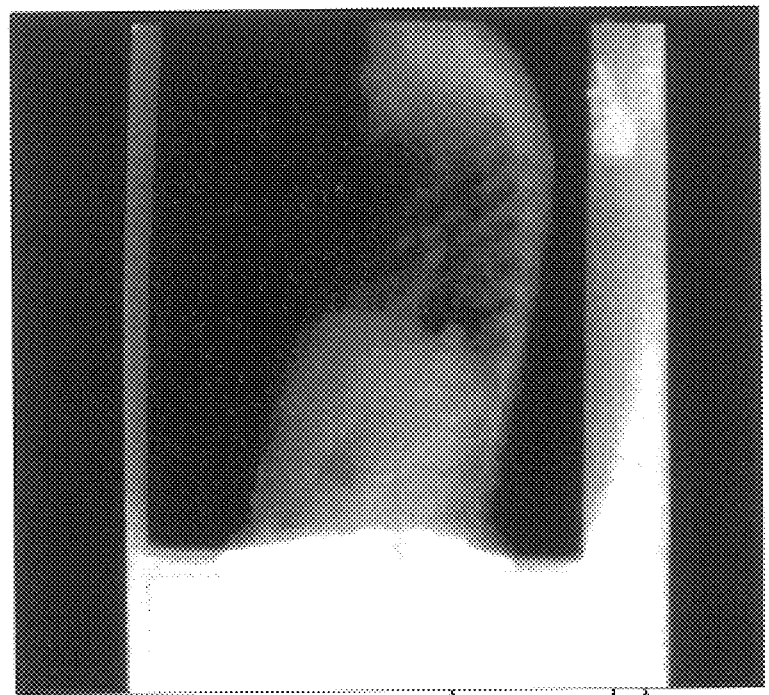
2.3 (c)　　(b)(a)
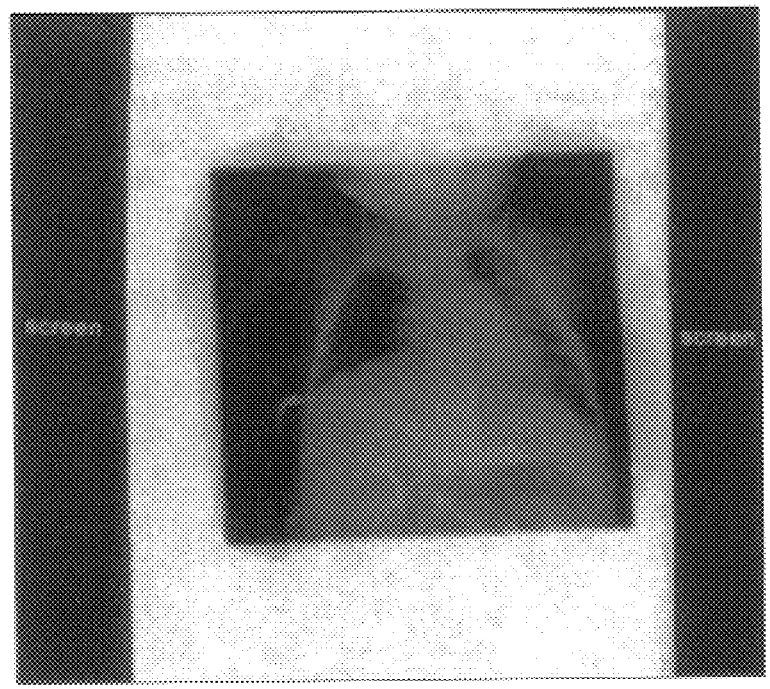
FIG. 7

| z1 | z2 | z3 |
|----|----|----|
| z4 | z5 | z6 |
| z7 | z8 | z9 |

$z5=(X,Y)$

| -1 | -2 | -1 |
|----|----|----|
| 0  | 0  | 0  |
| 1  | 2  | 1  |

| -1 | 0 | 1 |
|----|---|---|
| -2 | 0 | 2 |
| -1 | 0 | 1 |

FIG. 10A
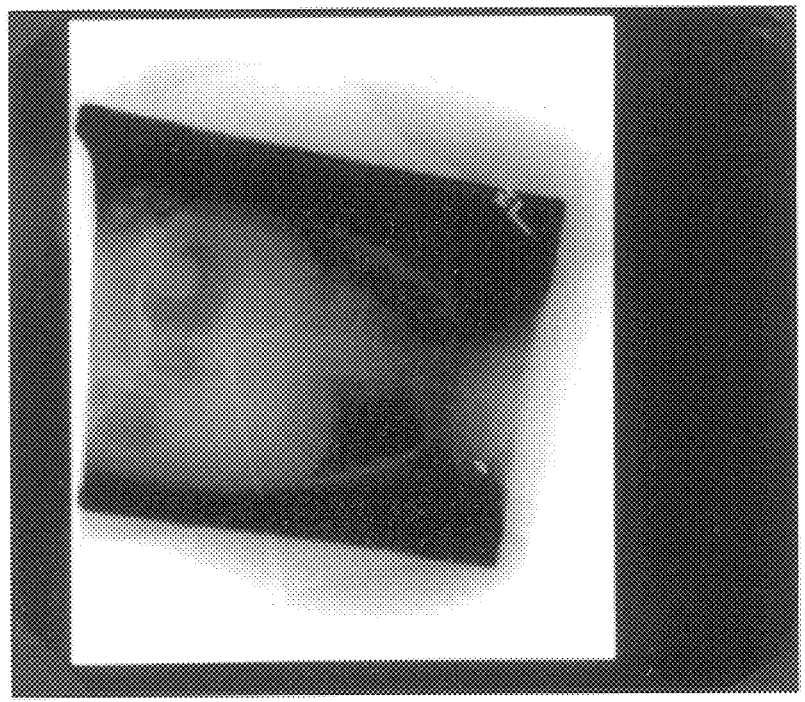
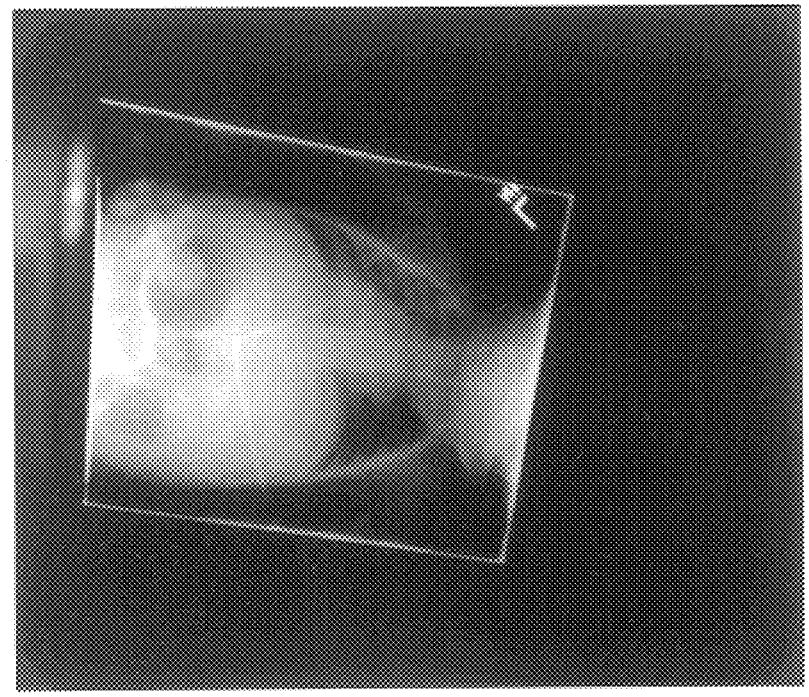
FIG. 10B

FIG. 11A
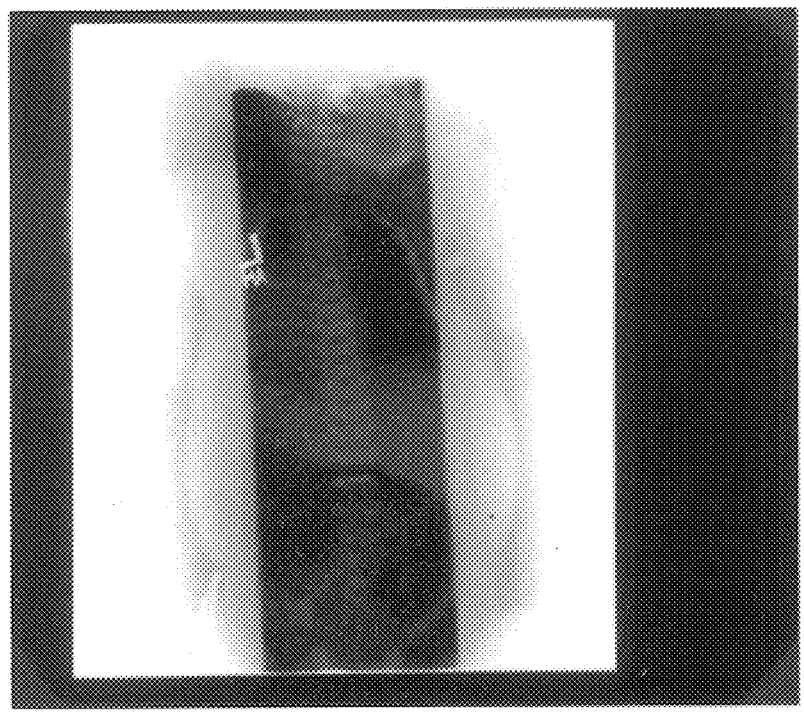
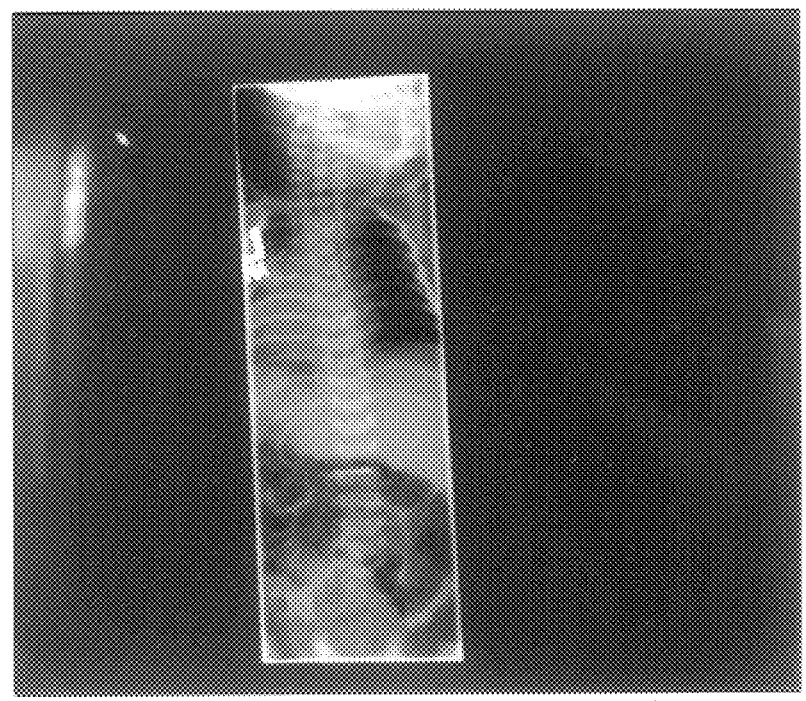
FIG. 11B

FIG. 12A
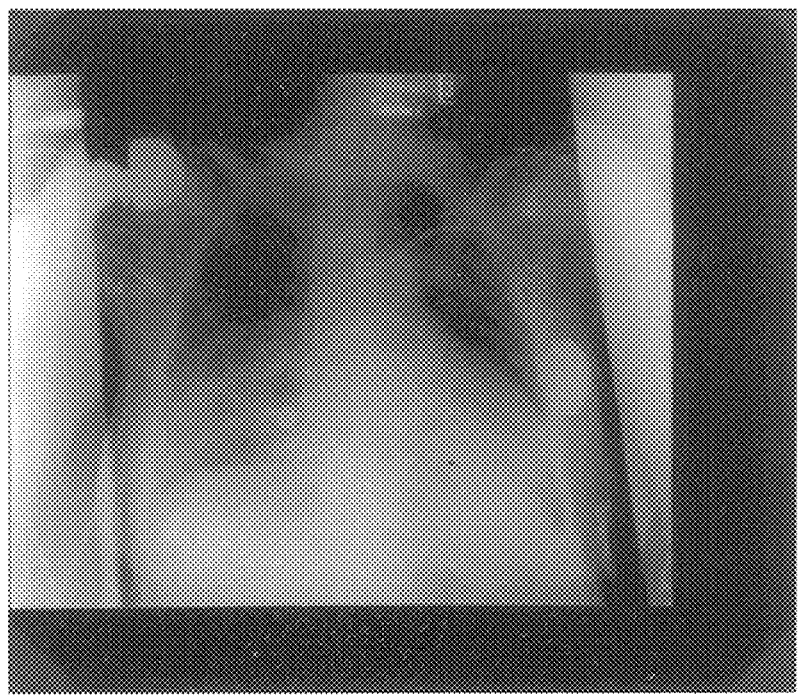
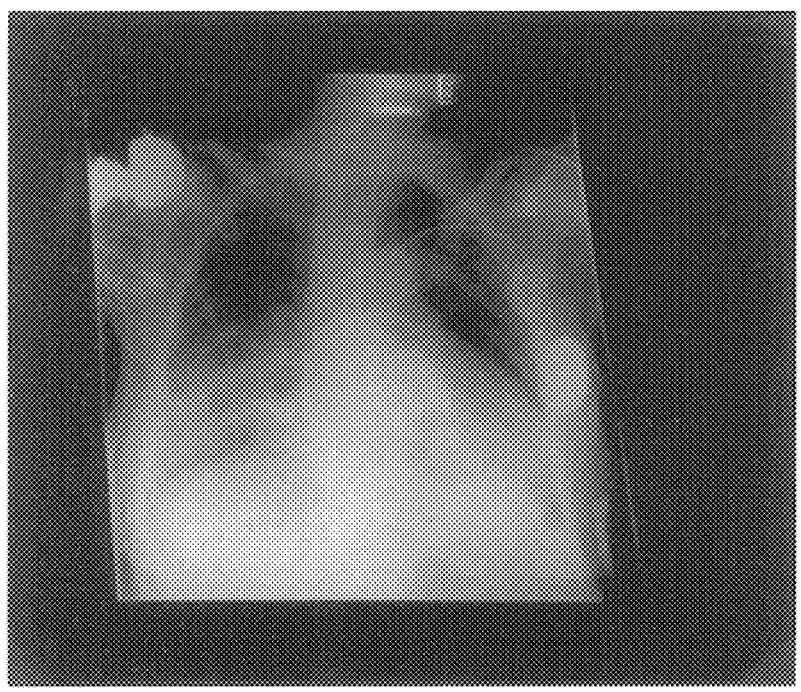
FIG. 12B

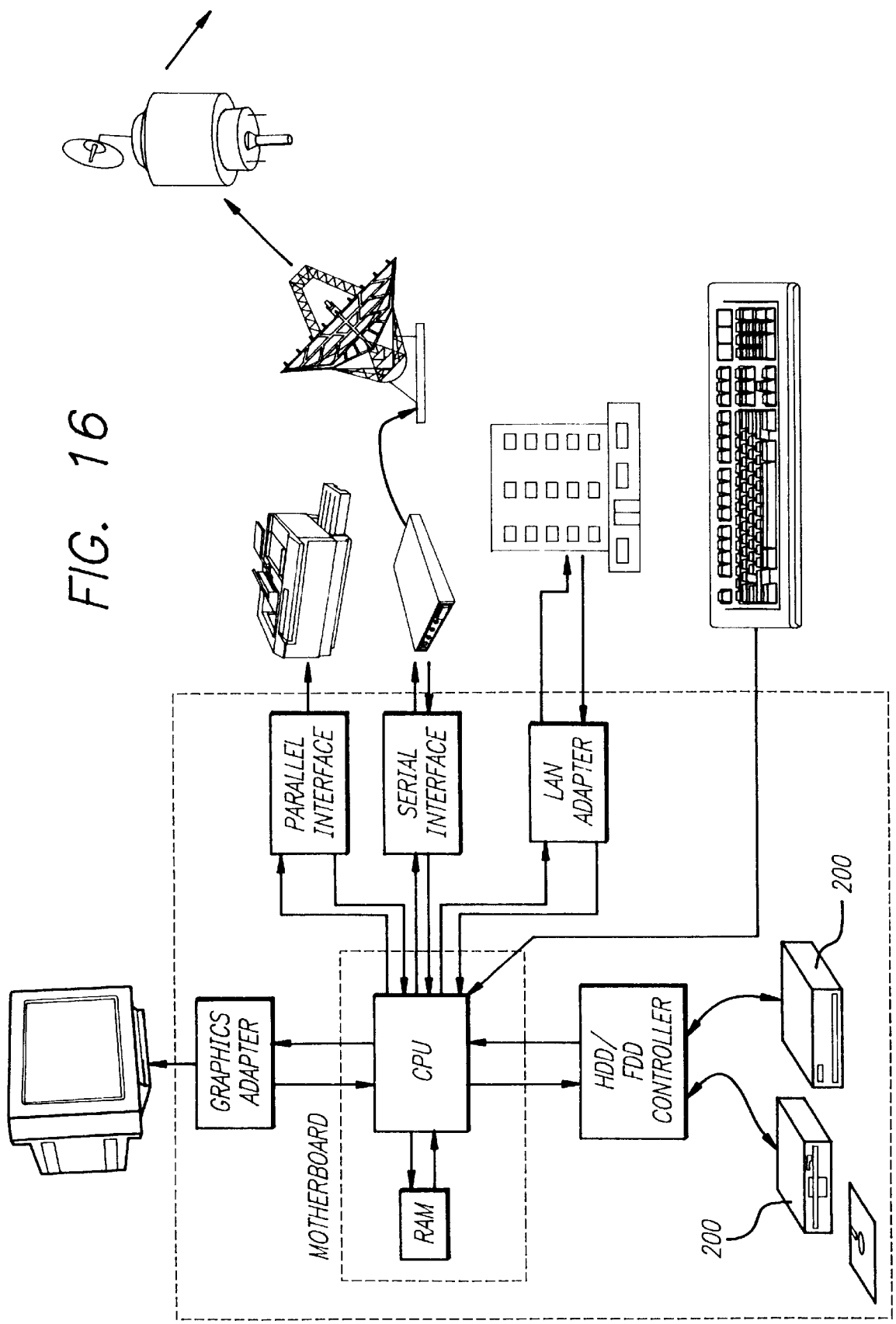

AUTOMATIC BACKGROUND RECOGNITION AND REMOVAL (ABRR) IN PROJECTION DIGITAL RADIOGRAPHIC IMAGES (PDRI)

BACKGROUND OF THE INVENTION

Projection radiography accounts for over 60% of procedures in diagnostic radiology. As digital imaging becomes more important in daily radiology practice, the need for converting images from projection radiography to digital format becomes apparent. Currently four digital methods are being used: digital fluorography (DF), film digitization, and computed radiography, and direct digital radiography. Digital fluorography uses a vidicon camera to capture X-ray images and convert them to digital images through a frame grabber. One type of film digitizer uses a laser beam to convert the optical densities on film to a digital image. Computed radiography (CR) aims to replace screen/film analog radiographs with direct digital images. The imaging plate (IP) used in CR is based on the principle of laser-stimulable phosphor technology. Direct digital radiography is a recently developed direct digital capturing method which converts the attenuated x-rays directly from solid state detectors to digital signals. During the past ten years, CR has been gradually replacing the screen/film system.

Under normal operating conditions, images obtained by projection radiography contain unexposed areas due to X-ray collimation: for example, areas outside the circle of the imaging field in DF and areas outside the collimator of CR for skeletal and pediatric radiology. In digital images, unexposed areas appearing white on a display monitor will be called background in this context. FIG. 7 is a pediatric CR image with white background as seen on a monitor. Background removal in this context means that the brightness of the background is converted from white to black.

There are four major advantages gained by performing background removal in digital projection radiography. First, background removal immediately provides lossless data compression, an important cost-effective parameter in digital radiography when dealing with large-size images. Second, a background-removed image has better image visual quality for the following reason. Diagnosis from radiography is the result of information processing based on observation with the eye. Since the contrast sensitivity of the eye is proportional to the Weber ratio DB/B, where B is brightness of the background, and DB is brightness difference between the region of interest in the image and the background, removing or decreasing the unwanted background in projection radiography images makes these images more easily readable and greatly improves their diagnostic effects. Third, once the background in a CR image is removed, a more representative lookup table pertinent to only the range of gray scales in the image and not the background can be assigned to the image. Thus, it can improve the perception of the images. Fourth, background removal is a crucial pre-processing step in computer-aided-diagnosis (CAD). A background-removed image can improve the diagnostic accuracy of CAD algorithms, as the cost functions in the algorithms can be assigned to the image only rather than to the image and its background combined.

In the cases of DF and the film digitizer, the background removal procedure is straightforward. In the former, since the size of the image field is a predetermined parameter, the background can be removed by converting every pixel outside the diameter of the image field to black. In the latter, since the digital image is obtained in a two-step procedure (first a film is obtained and then the film is digitized), the boundaries between the background and the exposed area can be determined interactively by the user, and the corner points may be input during the digitizing step.

In the case of CR, background removal is a more complex procedure since it has to be done automatically during image acquisition or preprocessing time. Automatic removal of CR background is difficult, because the removal algorithm has to recognize different body part contours as well as various collimator sizes and shapes. Since the background distribution in CR images is complex and the removal is an irreversible procedure, it is difficult to achieve a high successful ratio of full background removal and yet ensure that no valid information in the image is removed. Full background removal in this context means that no more background is left in the processed image. Some methods developed to remove the background of CR images can only achieve 42% background removal.

Usually, the background in CR images is created due to the X-ray collimator. FIG. 14 shows the X-ray imaging procedure of a pediatric patient. Most collimators may be considered as attenuators of X-rays. Depending on the sensitivity of the imaging plate (IP) to x-rays and the thickness of the collimator used, the background may not be of uniform intensity due to various body parts covered by the collimator. First, let us ignore the anatomical information in the CR background and assume that the X-ray beam is a point source as shown in FIG. 15A. Then the intensity distribution, I, is spherical function and can be described by:

$$I = a \cos^2\theta / r^2 \tag{1}$$

where "r" is distance between the source and IP center, "θ" is the angle between the pixel under consideration and the center line in the plane defined by the pixel under consideration and the center line, and "a" is a constant, as shown in FIG. 15A. The intensity distribution of uniform latent image stored in IP is shown in FIG. 15B. After laser scanning the IP, the optical image generated from the latent image is converted to a digital image and the intensity distribution is shown in FIG. 15C.

SUMMARY OF THE INVENTION

The present invention is a novel method and/or system for automatically recognizing and removing background signals in digital radiography images caused by X-ray collimation during projection radiographic examinations.

According to one aspect of the invention, a statistical curve is derived based on many hierarchical CR sample images as a first approximation to loosely separate image and background pixels.

According to another aspect of the invention, signal processing methods, including specific sampling, filtering and angle recognition, are used to determine edges between image and background pixels.

According to another aspect of the invention, adaptive parameter adjustments and consistent and reliable estimation rules are used to finalize the location of edges and remove the background. In addition, this aspect also evaluates the reliability of the complete background removal operation.

Other features and advantages of the invention will become apparent in view of the following detailed description and appended drawings.

BRIEF DESCRIPTION OF THE DRAWINGS

FIG. 1 is a block diagram of a method of practicing the invention;

FIG. 3 is a PDRI;

FIG. 7 is a PDRI with background;

FIGS. 9–12 are examples of CR images before and after background removal performed according to the present invention;

FIG. 16 is a block diagram of computer for executing software embodying the methods of the invention.

DESCRIPTION OF THE PREFERRED EMBODIMENT

This invention is based on statistical description of intensity distribution of projection digital radiographic image (PDRI) background, signal processing, such as sampling, filtering and the boundary angle determination, adaptive parameter adjustment, and consistently reliable estimation rules. FIG. 1 is a block diagram of the automatic background recognition and removal (ABRR) developed during this invention.

Each block of FIG. 1 will be described in detail below. The following is an overview of the diagram of FIG. 1. In the first block, an analysis of the intensity distribution features shows that neighboring pixels in the background image are characterized by relationships between their image values.

In the second block, a particular relationship between pixels is utilized to calculate a score for each pixel.

In the third block, a statistically significant sample of PDRIs is analyzed to determine pixel scores for pixels in the image and pixels in the background. A threshold value of the score indicating a high probability of a pixel being a background pixel is determined.

In the fourth block, various criteria, including sampling, filtering, and boundary angle determination, are utilized to identify a set of pixels located on an edge between two image areas of different intensity.

In the fifth block, threshold parameters are adaptively adjusted, based on the statistical analysis of pixel scores, to facilitate complete background removal.

In the final block, a reliable estimation of whether the background has been accurately located is performed prior to removal of the background from the image.

In this context, CR (computed radiography) equipment is used to produce the PDRI.

I. Analysis of Intensity Distribution Features of PDRI Background

Figure 2A:
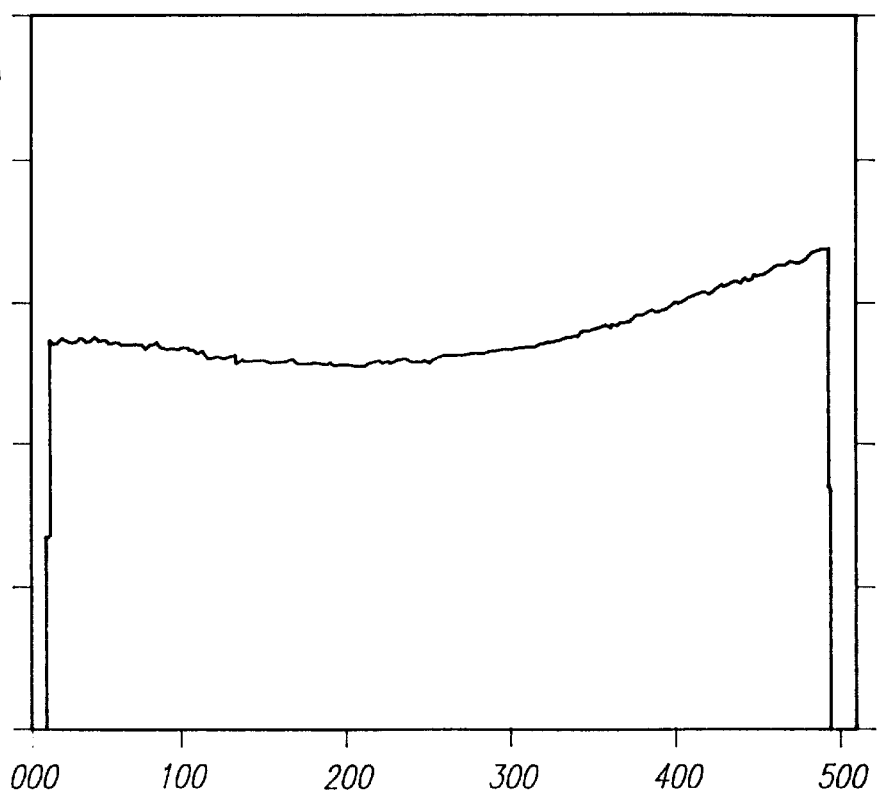
FIGS. 2A–2C are graphs depicting background intensity distributions.
Figure 2B:
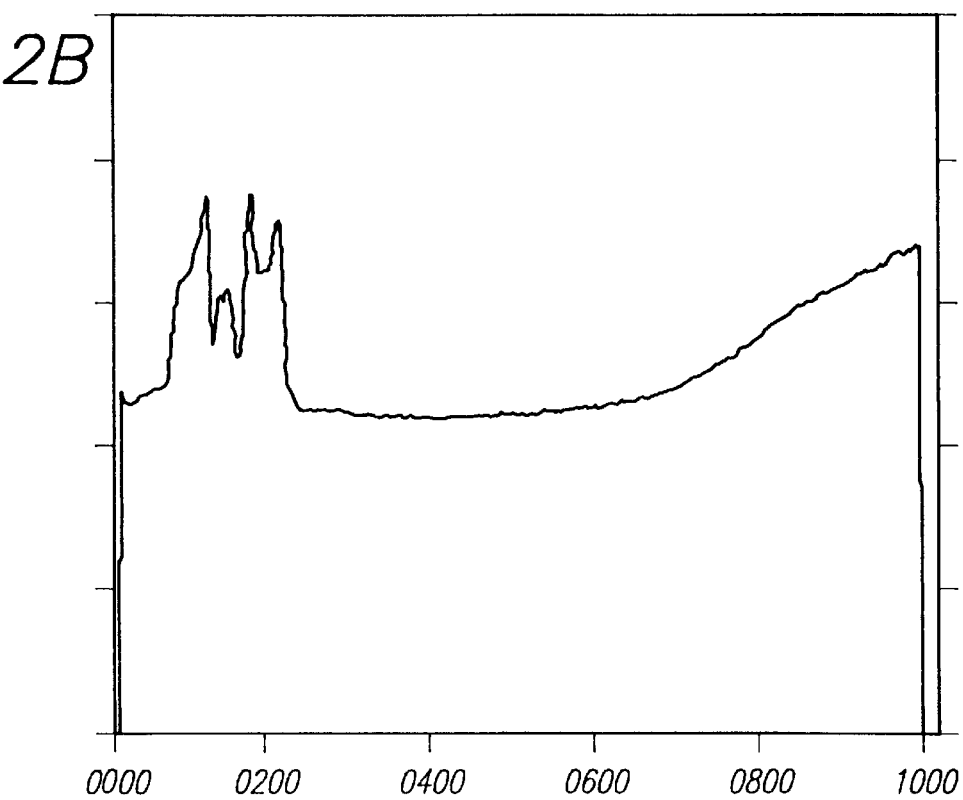
Figure 2C:
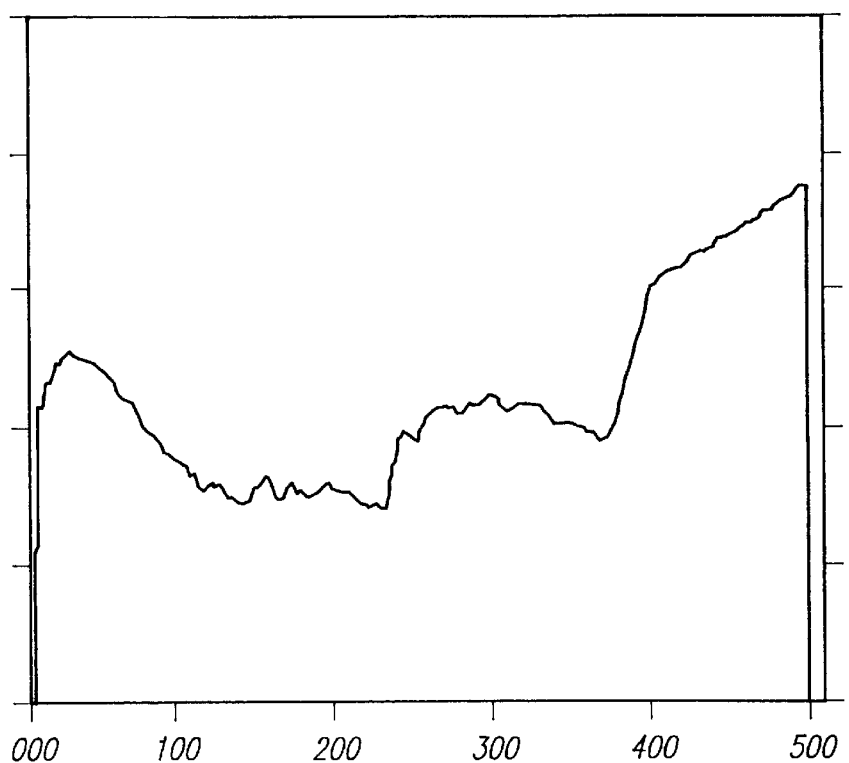

Sometimes parts of anatomy, combined with other external objects like prostheses and markers, are projected onto the background due to insufficient thickness of the collimator, high sensitivity of the receptor, or if the collimator center is not aligned with the center of the receptor. For these reasons, the shapes and intensity distribution of PDRI background are usually asymmetrical and complex. FIGS. 2(a)–2(c) show examples of background intensity distribution curves at three different location of a PDRI shown in FIG. 3 (see arrows). FIG. 2(a) is a pure uniform background distribution, FIG. 2(b) is a background distribution combined with external markers information, FIG. 2(c) is a distribution of part background and part anatomy.

II. Statistical description of PDRI background signals

Figure 4:
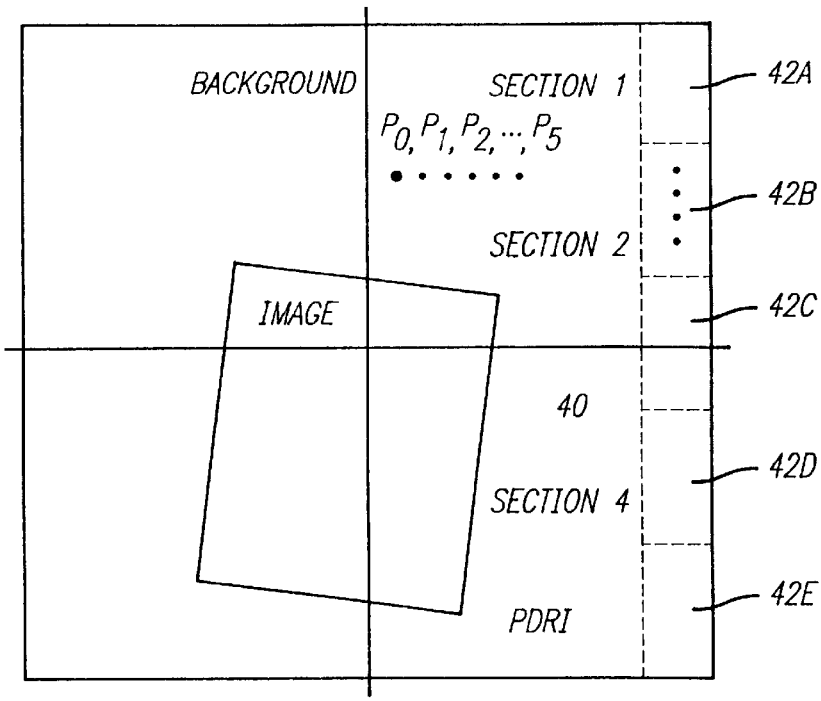
FIG. 4 is a schematic diagram of a PDRI with background.

The intensity distribution of PDRI background can be computed by Equation (1). Because gray levels of PDRI background are normally very high compared with the anatomical parts in the image, any three points $P_0$, $P_i$, $P_{i+1}$ in the background and away from the center of the image satisfy the following two conditions:

$$I_0 \geq T_p \qquad (2)$$

$$I_0 \leq I_i \leq I_{i+1}; \qquad (3)$$

where, $T_p$ is a threshold (given empirically), $I_0$, $I_i$, $I_{i+1}$ are average intensities of points located at $P_0$, $P_i$, $P_{i+1}$ shown in FIG. 4, $I_i$ is obtained by averaging the pixel values of $P_i$ and its neighbors.

Following, a statistical method is described to estimate the features of intensity distribution of a point in a PDR image background. Consider the right side of a PDR image and an arbitrary background point $P_0$ in FIG. 4. Five consecutive pixels $P_1$, $P_2$, $P_3$, $P_4$, $P_5$, from left to right next to $P_0$ are chosen, as shown in FIG. 4. If $P_0$ satisfies equation (2), and if any of these two consecutive pixels satisfy equation (3), $P_0$ gets 2 points, otherwise it gets 0 point. Since there are five possible consecutive pairs, the total score $P_0$ can get may be one of 10, 8, 6, 4, 2, 0. The higher the score is, the higher the probability that $P_0$ belongs to PDRI background.

Now, one side of the PDRI 40, say, the right hand side, is divided into five equal sections 42(a)–42(e) and from each section 10 equally distant points are selected in the vertical direction next from the right edge shown in the right side of FIG. 4. If the same score scheme is used for each of these ten points, then each section can get a maximum score of 100.

The above-described scoring system is exemplary of many possible systems of assigning a background priority score to a pixel location. For example, if any two consecutive pairs satisfy equations (2) and (3), $P_0$ may get 1 or 3 points. Also, the relationship of the score $P_0$ and any number of pairs satisfying equations (2) and (3) may be nonlinear, but the relationship should be monotonic increasing or decreasing. In this case, a new curve between the background score and the background probability may emerge similar to FIG. 5.

50 PDRI are randomly examined, some of which have background and some do not. The total number of sections examined is then 1000 (=50 PDRI×4 sides×5 sections). The possible score of each of these sections ranges from 0 to 100. Using this method, the relation curve was obtained between the score of a pixel and its corresponding background probability, shown in FIG. 5. For example, in these 50 PDRI there are 20 sections, the scores of which range from 45 to 55, and among these 20 sections, 5 are with background, so the background probability of the section score 50 [=(45+55)/2] is 0.25 (=5/20). Since a section has ten pixels, the normalized background score of a pixel in these sections is 5 [=50/10]. This point is shown as "*" in FIG. 5. With this curve, the background probability is approximate 1 after the score is larger than 8.

Because this curve is the statistical result of $10^4$ (=50×4×5×10) pixels on 50 different PDRI, this curve can be applied to every pixel in the image to describe the relation between its background probability and its score. It is important then, in order to have a better representative statistic, a large number of images are needed to produce the curve. A different PDRI system will produce a different curve.

III. Sampling of background edge signals

The key step of recognition or removal of PDRI background is to find out the background edges. In order to find out the position and direction of every edge, the angle and the value of the pixels under consideration are used. Because the value of pixels at the edges normally varies greatly, there are many methods to detect this variation, for example, finding the points with a gradient modular which are larger than a threshold, or those points whose standard deviation of pixel values exceeds an empirically determined threshold, etc. Here, the standard deviation and gradient angle θ determines points which belong to background edges.

First, an image is sub-sampled from a large size to a smaller size for faster computation, for example, from 2K×2K to 512×512, and call it V(x,y). Consider the right side of the image V(x,y), shown in FIG. 4, scan from right to left for every line in the horizontal direction of V(x,y), one pixel on every line is selected based on three criteria: (1) the standard deviation $S_d$ of which is larger than $T_g$ (empirically determined), (2) the position of which is in the right side of V(x, y) and (3) it is closest to the right boundary of the image. The standard deviation formula used is given by:

$$S_d = \{(\Sigma[I(x_i, y) - I(x, y)]^2)/m\}^{1/2} \quad (4)$$

where m=3, I(x, y) is the average intensity of $I(x_i, y)$, and i=1, 2, 3.

Some lines may have a pixel that satisfies these conditions, and some may not because no pixel satisfies the condition $S_d > T_g$ in that line. A pixel array $\{E_i(x, y)\}$ (i=1, 2, 3, . . . , n, is obtained, where "n" is the total number of pixels satisfying the conditions). Some of these pixels may be at the edge of PDRI background and some may not. Similarly, pixel arrays for left, top and bottom sides of the image are formed. The procedures of selecting the pixel's array which may be at the edges are similar to that of the right side; the only difference is the scanning direction.

The value of $T_g$ is determined by measuring the standard deviation of background edges in images obtained under different examination conditions, finding the range of these standard deviation values and choosing a smaller value as $T_g$. For example, if the range is from 20 to 100, 30 is selected as $T_g$ because it is within the range and close to the smaller value.

IV. Filtering and determination of the angle of background edges

Figure 5:
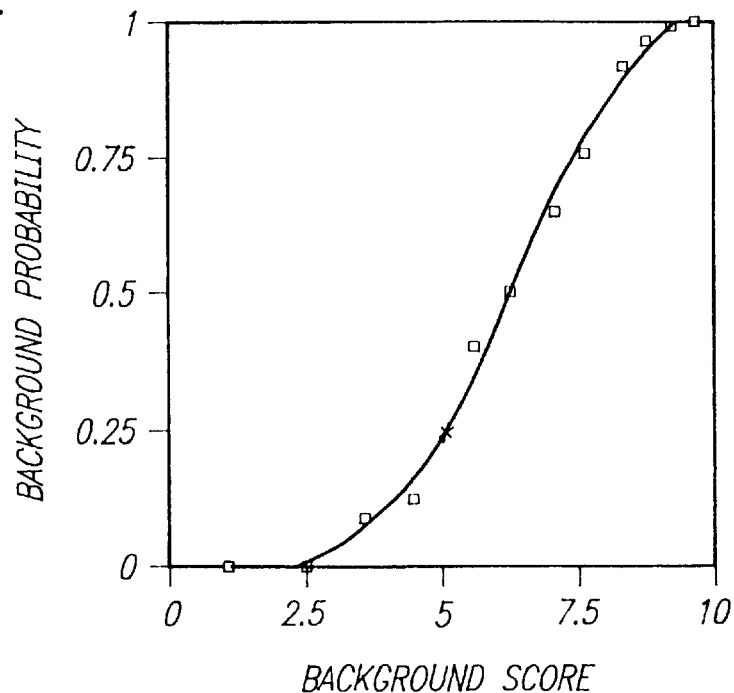
FIG. 5 is a graph of background score vs. background probability.

Next, those pixels in $\{E_i\}$ which belong to the edge are filtered out. Now, the right side of the image is considered. This can be accomplished in two steps, by using the pixel background probability and the angle information. First, the score on right side of every pixel of $\{E_i,$ i=1, 2, . . . , n} is calculated, using the same method described in Section II. Once the score of a pixel is obtained, the curve in FIG. 5 is used to determine this pixel's background probability. If the score is greater than 8 (full score is 10 for every point), the probability that it is a background pixel is almost one. Then, this point is filtered out as a possible point belonged to the background. After applying this algorithm to $\{E_i\}$, a new point array $\{E'_j,$ j=1, 2, 3, . . . , n'} is obtained and most of $\{E'_j\}$ should belong to the background.

In order for a pixel in $\{E'_j\}$ to be at a background edge, it should satisfy two conditions. First, it must be verified that the pixels in $\{E'_j\}$ are on a background edge. This can be determined as follows. Again, consider the right-hand edge; if the difference of the average intensity of a pixel in $\{E'_j\}$ with its left nearest neighboring pixel average intensity is larger than that of this pixel to its right, then this pixel is on the edge. Mathematically, if $I_1$ is an average pixel value of $P_1$ in $\{E'_j\}$, $I_L$ is average pixel value on the left side $P_1$, $I_R$ is that on the right side, the condition is $I_1 - I_L > I_R - I_1$.

Figures 6A, 6B, 6C, 6D:
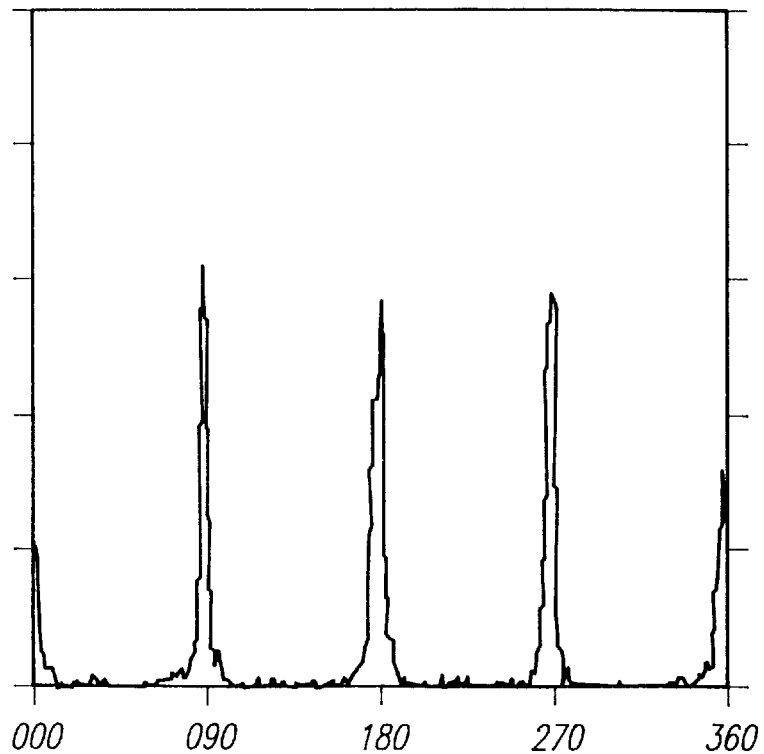
FIGS. 6A–6C depict masks used to compute Gx and Gy.
FIG. 6D is a graph depicting angle distribution curves for pixels on the edge of a PDRI.
Figure 9A:
Figure 9B:
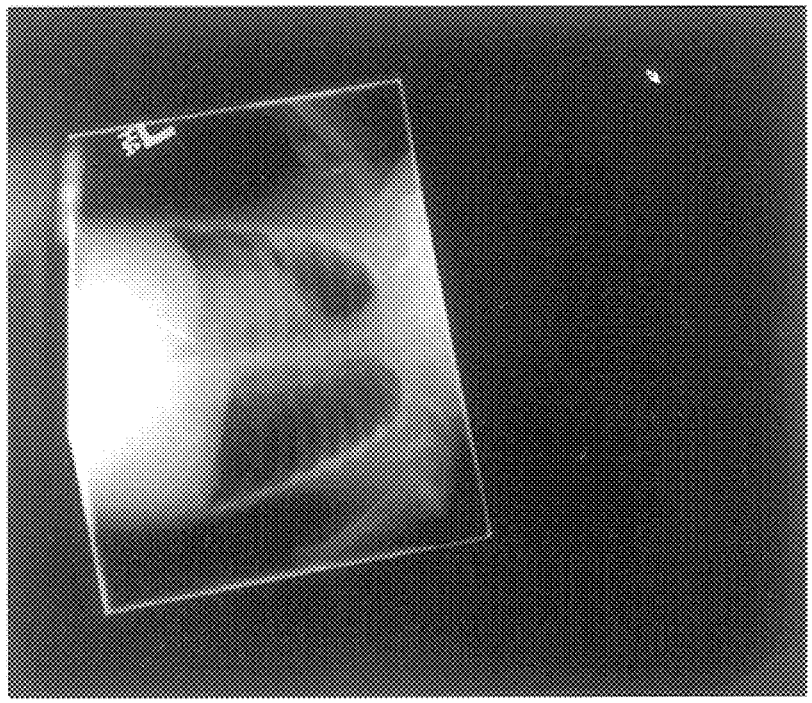

Second, angle information of every point in $\{E'_j\}$ which satisfies the first condition is used to delete those pixels which do not belong to the edge. The Sobel gradient operator (3×3 image region) is used to calculate the angle of every pixel in $\{E'_j\}$ which is given by:

$$\theta(x, y) = \tan^{-1}(G_y/G_x) \quad (5)$$

and Gx, Gy are give by $$Gx = (Iz7 + 2*Iz8 + Iz9) - (Iz1 + 2*Iz2 + Iz3) \quad (6)$$

$$Gy = (Iz3 + 2*Iz6 + Iz9) - (Iz1 + 2*Iz4 + Iz7) \quad (7)$$

where masks used to compute Gx and Gy are depicted in FIGS. 6A–6C.

Since most collimator edges are straight, the background edges should be straight lines. Because the gradient direction of pixels at the edge should be almost the same and perpendicular to the edge, the distribution of their gradient angles θ(x,y) of $\{E'_j\}$ should have maximum values. This angle $\theta_m$ related to this maximum value is selected as a reference angle to which all the gradient angles at the edge should be close to. All pixels in $\{E'_j\}$ which are not in the half width full maximum of the gradient angle distribution curve are deleted, the remaining pixels $\{E''_k,$ k=1, 2, 3, . . . , n''} the angles of which are within the half width full maximum are used to fit a line which should be coincide with the background edge. FIG. 6D shows angle distribution curves for four sides of the image shown in FIG. 7.

During line fitting, the contribution of every pixel selected to the fitted line is different with varying weights. The weights(w) can be determined by the following formula:

$$w = A * e^{\Delta \theta \Delta} \quad (8)$$

where "A" is a constant, and "Δθ" is the angle difference between the angle of maximum distribution $\theta_m$ and the gradient angle of that pixel. So, the larger the angle difference is, the smaller the contribution of that pixel to the fitted line would be.

In the above description, a rectangular object area 40 in FIG. 4 was utilized. The techniques of the invention can easily be adapted to object areas having different shapes.

For example, this invention can be utilized to recognize and remove the background caused by polygon collimators. The way of this modification is to find out the number of peaks in the angle distribution curve, use those pixels which are in the half width of the peaks to fit the lines one by one, and remove the background outside of the polygonal contour surrounded by these lines.

This invention can also be utilized to recognize and remove the background caused by circular collimators. The way of this modification is: (1) Use the gradient angle information and the coordination of pixels selected by sampling and filtering to form straight line equations, every pixel has its own line equation and a corresponding normal passed through it; (2) All the normals should intersect at a point in the image. This point should be the center of circular collimator and the distance between the center and the pixels should be the radius of the image of the circular collimator; (3) Remove the background outside of the circle.

This invention can also be utilized to recognize and remove the background from a composite image produced by multiple exposures with collimation. The way of this modification is: (1) Decompose the composite PDRI image to several parts, with each part contains one exposure area which consists of both the background and a sub-image; (2) Apply the ABRR algorithm to each individual part to remove the background; (3) Piece together all background removed parts to form a new composite image according to their positions in the original composite image with multiple exposures.

This invention can also be utilized for different sizes of PDRI. The way of this variation is to first find out the dimensions of the image, and determine the full scores of each side of the image, then normalize the score to one pixel as before. Next step is the same as described for the 512×512 size image.

V. Adaptive adjustment of parameters

Before using pixels $\{E''_k\}$ to fit a line, a threshold $T_s$ must be determined. This threshold is based on how many pixels in $\{E''_k\}$ which have the angle with a maximum value. If $p_m \geq T_s$ ($p_m$ is the peak value of angle distribution, or number of pixels), then the line fitting is performed, otherwise, $\{E''_k\}$ will be discarded because this set of pixels may be noise or artifacts.

Since some background edges are very long and distinct and some are not, the $p_m$ for a long distinct edge is very large and for an unclear edge is very small. Meanwhile, some angle distribution curves of images with no background may also have peaks with small $p_m$ value which are created by some objects or anatomy with straight line segments. If $T_s$ is set high, the probability of fitting a line as an edge is high, but the ratio of full background removal would be low. Full background removal in this context means that no more background is left in the processed image. In order to solve this problem, an algorithm adjusts $T_s$ dynamically based on the background characteristic of the image under consideration.

Figure 8:
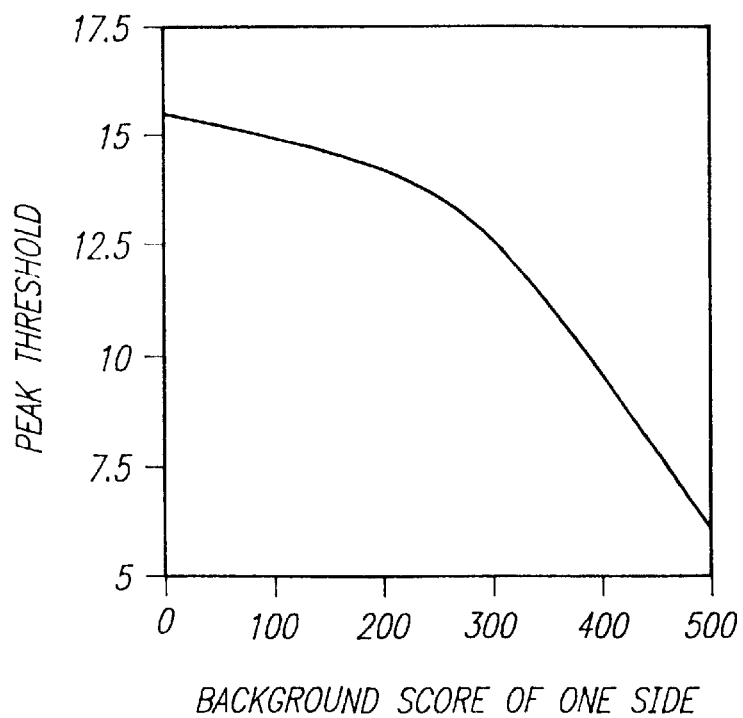
FIG. 8 is a graph depicting the peak threshold of angle distribution vs. the total score of a PDRI.

Since all pixels selected are based on their background scores and their high probability of being background pixels based on the statistical curve shown in FIG. 5, a relation between $T_s$ and the total score of the one side of the image is established by using the following equation:

$$T_s = B + C*[1-e^{-(H-X)/V}] \qquad (9)$$

where "B" and "C" are constants determined empirically, "H" is the full score of one side (in the present situation H=500), V=H/2, and "X" is the total score of the five sections in one side of the image. FIG. 8 is the curve of equation (4), where B=6, C=10.

The relationship between the background probability and threshold is indicated by the relationship of the curves in FIGS. 5 and 8, with the curve in FIG. 8 being approximately a reflection of the curve in FIG. 5.

The way to determine B and C is to examine many PDRI with background (e.g., 50 cases), and find the minimum peaks due to background edges, and the maximum peaks from some objects or anatomy with straight line segments. The B which is selected should be larger than the peak from objects and close to the value of minimum peak due to background edges, and B+C which should be smaller than the average value of peaks caused by background edges.

With equation (9), the threshold $T_s$ can be changed dynamically according to the total score in one side of the image. So, although the peak values of angle distribution curves of unclear edges, segments of objects, or some anatomy may be the same, their thresholds may be different.

Thus, an image with background can have a low edge threshold, but there could be a background removal operation if that side of the image has a high score. On the other hand, one side of an image can have a high edge threshold, but there may not be a background removal process if the background score is low. This adaptive adjustment of parameters balances the reliability of background removal and the ratio of full background removal before the line fitting. According to experiment, the ratio of full background removal is 72% before this adaptive parameter adjustment and 93% after this adaptive parameter adjustment without cutting off any pertinent image data.

VI. Reliable estimation of background removal

Before and after background removal operation there should be some necessary steps to examine the reliability of this operation, because automatic background removal (ABR) is an irreversible procedure and the image cannot be recovered once the valid image data is discarded. Here, a consistently reliable estimation before and after background removal is described.

Assuming the equation of the fitted line is given by:

$$y = a + b\,x \qquad (10)$$

where a and b are constants. In order to estimate the goodness-of-fit of the points $\{E''_k\}$ to the line, Chi-Square Fitting is applied to these points and an estimates the goodness-of-fit by use of the Q value calculated from incomplete gamma function and the coefficients of probable uncertainties ($\Delta a$ and $\Delta b$). If $Q \geq 0.001$, and $\Delta a/a \leq 0.01$, $\Delta b/b \leq 0.001$, the fitting is acceptable. Another estimation is to compare the angle of fitted line $\theta_b = \tan^{-1}(b)$ with $\theta_m$, the angle of distribution maximum in FIG. 6D. If $\theta_b$ is equal or approximately equal to $\theta_m$, this fitting is consistent with filtering and angle determination procedures and the background removal will be applied to the image according to the parameters of equation (9). The acceptable angle difference $(\theta_m - \theta_b)$ is chosen to be about 6°.

After background removal, the reliability can be estimated by comparing the histograms of the PDRI between the original and the background removed. Since the gray levels of the background are normally higher than $T_p$ in Equation (2), most portions of the histogram lower than $T_p$ should be unchanged before and after background removal. With this comparison, it can be determined whether the image has been trimmed too much after background removal.

All operations discussed are performed on subsampled PDRI (512×512) from (2K×2K) for computational efficiency. If all reliable estimations are passed, the background on the original PDR image (2K×2K) is removed according to Equation (10).

The ABRR technique can be used to calculate precisely the PDRI image display parameters and to obtain a preferred lookup table (LUT) for soft copy display on a monitor. The way to do this is: (1) Use ABRR to process the PDRI image and to remove the background; (2) Calculate the histogram of the background removed PDRI image and obtain a set of display parameters (e. g., window and level); (3) Set up a LUT for this PDRI image according to the window/level parameters. The visual quality of the background removed PDRI image displayed on a monitor should be better with this LUT.

FIGS. 9–12 show some images before and after background removal using the method developed above. Each case has its own different characteristics.

VII. Implementations of the Invention

Today, about 60% of radiological examinations are using the projection radiographic method. During the past ten years, projection digital radiographic (PDR) method is gradually replacing conventional screen/film method. Leading manufacturers producing PDR, or called computed radiography (CR) system in this field, include Fuji, Kodak, Philips, Dupont, and AGFA. In order for PDRI be most effective for diagnosis, background removal is an important first step after the image is generated.

One way of practicing the automatic background recognition and removal (aBRR) method of the present invention is to implement the method to a software package or a hardware module. This package or module then becomes a component:

1) in the CR or the film digitizer (FD) equipment;
2) in a server which receives the raw CR, DR, or FD images;
3) in a workstation (softcopy); or
4) in a printer.

Figure 13:
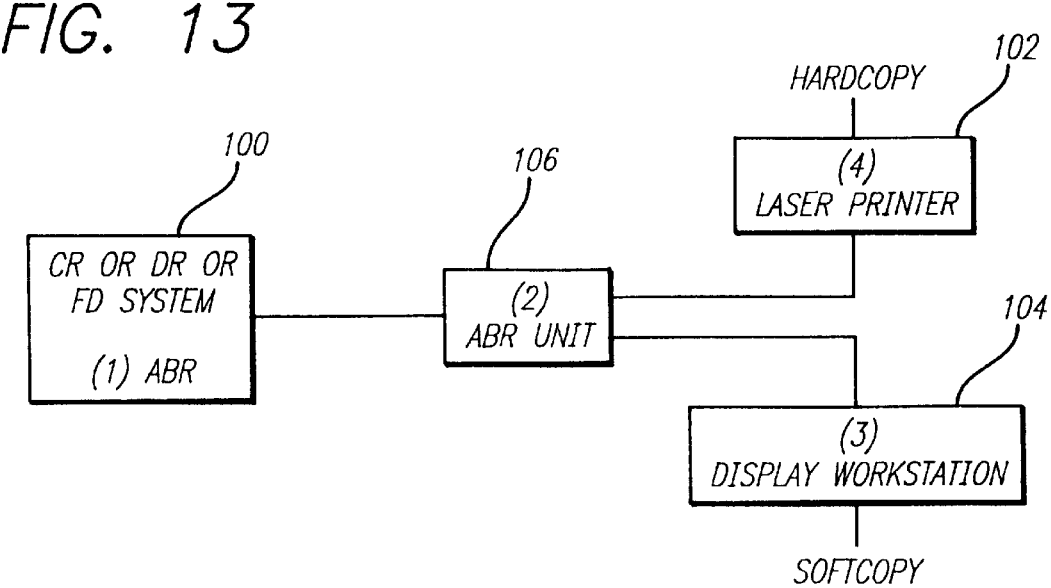
FIG. 13 is a block diagram of a system for implementing the invention.
Figure 14:
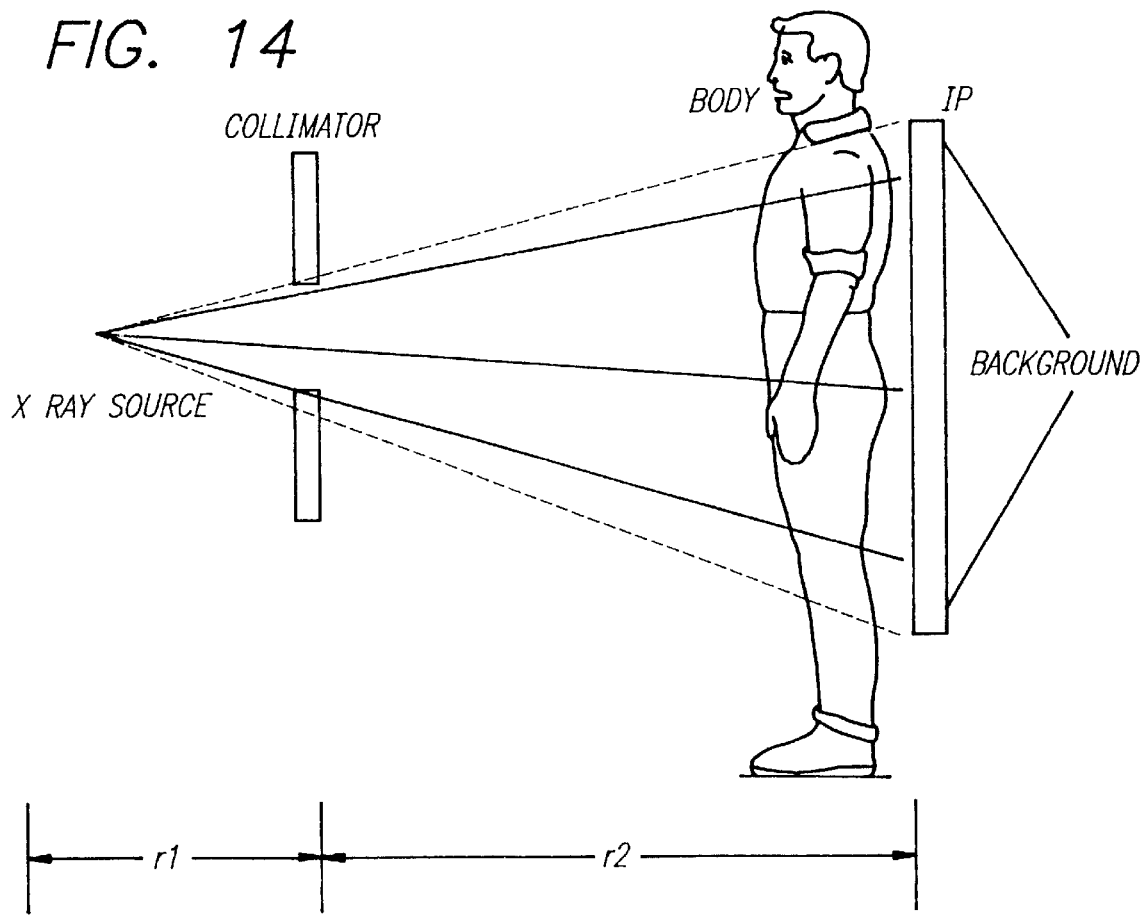
FIG. 14 depicts an imaging procedure for a patient.

FIG. 13 shows the proper position of the ABR in a CR system or a FD.

Referring to FIG. 13, an image generating unit 100 is shown connected to a printer 102 and/or a workstation 104 by an optional server 106. If aBRR is performed in the image generating unit 104 then the remaining parts of the system can be standard parts. If a standard image generating unit 100 is utilized the aBRR is performed by a server or can be directly implemented in the workstation or printer.

As described above, the invention can be embodied in software stored on a computer usable medium or as hardware, for example, hard coded in a digital signal processor (DSP) chip.

FIG. 16 depicts a typical computer including a storage medium 200 or 201 for storing computer usable code that, when executed, causes the computer to perform the steps described above. The method can be coded by a person of skill in the art in any number of languages, for example C or C++, as is well known in the art.

Alternatives and substitutions will now be apparent to persons of skill in the art.

Figure 15C:
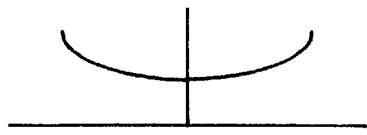
FIGS. 15A–15C depict image intensity curves.
Figure 15B:
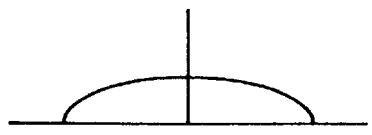
Figure 15A:
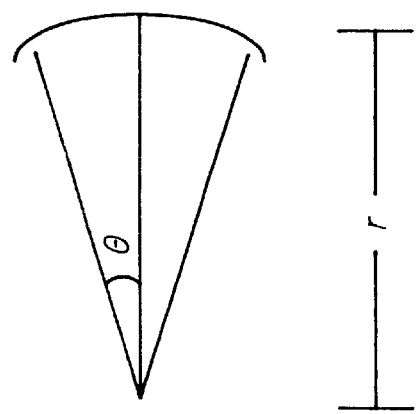

For example, the invention has been described for a digital projection having a background intensity distribution as depicted in FIG. 15a. However, the invention can be modified to recognize other patterns of x-rays intensity distribution which can be described by formulas or rules. Another example of a distribution would be light scattering which would have a background characterized by another formula. The techniques described herein would be used to develop a statistical model to describe the relationship between the probability of a pixel belonged to a pattern (in the current invention, it is the background) and its score, and use this relation to recognize the patterns.

Accordingly, it is not intended to limit the invention except as provided by the appended claims.

What is claimed is:

1. An automatic background recognition and removal process for removing background signals, caused by collimation during projection, from projection digital radiographic images (PDRI), with a PDRI comprising a set of image pixels, each encoding an image value and identified by a set of (x,y) coordinates, said method comprising the steps of:

scanning a set of lines of said image to identify an edge candidate pixel in each line scanned having an image value which varies in value from the image value of a neighbor pixel by at least a first threshold value;

collecting said candidate pixels into a first set of edge candidate pixels;

calculating a background score value for each edge candidate pixel in said first set, with a higher background score indicating a higher probability that a pixel is located in the background;

filtering said first set to discard all edge candidate pixels having a calculated background score value less than a probability threshold value from said first set to form a second edge set of edge candidate pixels;

determining which edge candidate pixels in said second set of edge candidate pixels are not located on an edge of two image areas of different intensity;

filtering said second set to discard all edge candidate pixels in the second set which are not on an image edge to form a third set of edge candidate pixels;

adaptively determining an edge probability threshold value for the number of pixels in said third edge pixel set based on a calculated value of background score of a side of the image nearest to the edge, with said threshold value increased if the calculated value is small and decreased if the calculated value is large;

fitting a line to the pixels in said third edge pixel set if the number of pixels in said set is greater than the edge probability threshold value adaptively determined for the third set; and performing background removal of all pixels outside the image edge determined by the line.

2. The process of claim 1, wherein said step of determining which edge candidate pixels in said second set are not located on an image edge further comprises the steps of:

determining an image gradient direction (angle) value of each edge candidate pixel in said second set;

determining a set of maximum image gradient value peaks based on a distribution of image gradient direction values of edge candidate pixels in said second set, with each maximum image gradient peak characterized by a half width; and identifying all edge candidate pixels not having image gradient values within the half width of a maximum image gradient value peak as not being located on an image edge.

3. The process of claim 1, further comprising the steps of:

performing a background removal reliability check prior to said step of performing background removal; and canceling said step of background removal if said background removal reliability check indicates that background removal would adversely affect the PDRI.

4. The process of claim 3, wherein said step of performing a background removal reliability check comprises the steps of:

forming an first intensity level histogram of said PDRI prior to background removal;

forming a second intensity level histogram of said PDRI if background removal were performed; and comparing sections of said first and second histograms for intensity levels below a background threshold level to determine if a significant portion of the image would be truncated if background removal were performed.

5. The process of claim 1, wherein said step of adaptively determining an edge probability threshold value comprises the steps of:

empirically determining a maximum value smaller than the average value of peaks caused by background edges in a statistically significant set of PDRIs;

empirically determining a minimum value larger than peaks due to image edges not in the background and about equal to the minimum value of background edges in said statistically significant set of PDRIs;

setting said edge probability threshold value near said maximum value if the background probability of the image area nearest to the edge is small; and setting said edge probability threshold value near said minimum value if the background probability of the image area nearest to the edge is large.

6. The process of claim 5, wherein the edge probability threshold function is determined by:

$$B+C(1-f(x))$$

where:

B+C is equal to said maximum value;

B is equal to said minimum value;

x is the background score of the image area nearest to the edge; and f(x) increases when x increases to a maximum value of 1.

7. An automatic background recognition and removal process for removing background signals, caused by collimation during projection, from a projection digital images, with a projection digital image comprising a set of image pixels, each encoding an image value and identified by a set of (x,y) coordinates, said method comprising the steps of:

scanning a set of lines of said image to identify an edge candidate pixel in each line scanned having an image value which varies in value from the image value of a neighbor pixel by at least a first threshold value;

collecting said candidate pixels into a first set of edge candidate pixels;

assigning a background priority score value to each edge candidate pixel;

filtering said first set to discard all edge candidate pixels having a background priority score value less than a probability threshold value from said first set to form a second edge set of edge candidate pixels;

determining which edge candidate pixels in said second set of edge candidate pixels are not located on an edge of two image areas of different intensity; and filtering said second set to discard all edge candidate pixels in the second set which are not on an image edge to form a third set of edge candidate pixels.

8. The process of claim 7 further comprising the steps of:

adaptively determining an edge probability threshold value for the number of pixels in said third edge pixel set based on a calculated value of background score of a side of the image nearest to the edge, with said threshold value increased if the calculated value is small and decreased if the calculated value is large.

9. A computer program product for use in a computer, the computer program product comprising:

a computer usable medium having computer readable program code physically embodied therein for causing the computer to perform an automatic background recognition and removal process for removing background signals, caused by collimation during projection, from a projection digital radiographic images (PDRI), with a PDRI comprising a set of image pixels, each encoding an image value and identified by a set of (x,y) coordinates, said computer program product further comprising:

computer readable program code for causing said computer to scan a set of lines of said image to identify an edge candidate pixel in each line scanned having an image value which varies in value from the image value of a neighbor pixel by at least a first threshold value;

computer readable program code for causing said computer to collect said candidate pixels into a first set of edge candidate pixels;

computer readable program code for causing said computer to calculate a background score value for each edge candidate pixel in said first set, with a higher background score indicating a higher probability that a pixel is located in the background;

computer readable program code for causing said computer to filter said first set to discard all edge candidate pixels having a calculated background score value less than a probability threshold value from said first set to form a second edge set of edge candidate pixels;

computer readable program code for causing said computer to determine which edge candidate pixels in said second set of edge candidate pixels are not located on an edge of two image areas of different intensity;

computer readable program code for causing said computer to filter said second set to discard all edge candidate pixels in the second set which are not on an image edge to form a third set of edge candidate pixels;

computer readable program code for causing said computer to adaptively determine an edge probability threshold value for the number of pixels in said third edge pixel set based on a calculated value of background score of a side of the image nearest to the edge, with said threshold value increased if the calculated value is small and decreased if the calculated value is large;

computer readable program code for causing said computer to fit a line to the pixels in said third edge pixel set if the number of pixels in said set is greater than the edge probability threshold value adaptively determined for the third set; and computer readable program code for causing said computer to perform background removal of all pixels outside the image edge determined by the line.

* * * * *